(12) United States Patent
Tavor

(10) Patent No.: US 8,676,824 B2
(45) Date of Patent: Mar. 18, 2014

(54) AUTOMATIC SEARCH QUERY CORRECTION

(75) Inventor: Guy Tavor, Tel Aviv-Jaffa (IL)

(73) Assignee: Google Inc., Mountain View, CA (US)

( * ) Notice: Subject to any disclaimer, the term of this patent is extended or adjusted under 35 U.S.C. 154(b) by 885 days.

(21) Appl. No.: 11/956,692

(22) Filed: Dec. 14, 2007

(65) Prior Publication Data

US 2009/0222445 A1    Sep. 3, 2009

Related U.S. Application Data

(60) Provisional application No. 60/875,425, filed on Dec. 15, 2006, provisional application No. 60/884,839, filed on Jan. 12, 2007.

(30) Foreign Application Priority Data

Apr. 16, 2007    (CN) .......................... 2007 1 0101817

(51) Int. Cl.
*G06F 17/30*    (2006.01)
(52) U.S. Cl.
USPC .......................................... 707/759; 707/760
(58) Field of Classification Search
USPC ................ 707/6, 749, 10, 999.005, 999.004, 707/999.003, 769, 759, 760
See application file for complete search history.

(56) References Cited

U.S. PATENT DOCUMENTS

| 5,535,119 | A | * | 7/1996 | Ito et al. ............................ 704/3 |
| 6,065,003 | A | * | 5/2000 | Sedluk .................................. 1/1 |
| 6,272,456 | B1 |   | 8/2001 | de Campos |
| 6,292,772 | B1 |   | 9/2001 | Kantrowitz |
| 6,326,953 | B1 | * | 12/2001 | Wana .............................. 345/168 |
| 7,113,904 | B2 |   | 9/2006 | Litster et al. |
| 7,310,605 | B2 |   | 12/2007 | Janakiraman et al. |
| 7,562,007 | B2 |   | 7/2009 | Hwang |
| 7,590,626 | B2 |   | 9/2009 | Li et al. |
| 7,797,152 | B1 |   | 9/2010 | Waite et al. |
| 7,813,920 | B2 |   | 10/2010 | Leung et al. |

(Continued)

FOREIGN PATENT DOCUMENTS

| EP | 0967555 A2 | 12/1999 |
| EP | 1577793 A2 | 9/2005 |

(Continued)

OTHER PUBLICATIONS

International Search Report and Written Opinion for PCT application No. PCT/US2007/087582, dated May 15, 2008.

(Continued)

*Primary Examiner* — Etienne LeRoux
*Assistant Examiner* — Fariborz Khoshnoodi
(74) *Attorney, Agent, or Firm* — Fish & Richardson P.C.

(57) ABSTRACT

A first search query is received from a user, the first search query having one or more characters, and a search result is determined based on the first search query. Based on the search result, the first search query is determined to have an incorrect input mapping. A first keyboard layout is identified for the first search query, and a second keyboard layout is identified. A corrected search query is generated from the first search query by mapping characters from the first keyboard layout to characters in the second keyboard layout. A corrected search result is determined based on the corrected search query, and the corrected search result is presented to the user.

19 Claims, 3 Drawing Sheets

(56) References Cited

U.S. PATENT DOCUMENTS

| | | | |
|---|---|---|---|
| 8,229,732 | B2 | 7/2012 | Davtchev et al. |
| 2002/0047831 | A1 | 4/2002 | Kim et al. |
| 2003/0023420 | A1 | 1/2003 | Goodman |
| 2003/0191626 | A1 | 10/2003 | Al-Onaizan et al. |
| 2004/0093333 | A1* | 5/2004 | Suzuki et al. .................... 707/3 |
| 2004/0260536 | A1 | 12/2004 | Hwang et al. .................... 704/9 |
| 2005/0119875 | A1 | 6/2005 | Shaefer et al. |
| 2005/0182616 | A1 | 8/2005 | Kotipalli |
| 2005/0195171 | A1 | 9/2005 | Aoki et al. |
| 2005/0216253 | A1 | 9/2005 | Brockett |
| 2007/0011132 | A1 | 1/2007 | Zhou et al. |
| 2007/0055493 | A1 | 3/2007 | Lee |
| 2007/0156404 | A1 | 7/2007 | Lee et al. |
| 2007/0189613 | A1* | 8/2007 | Tanaka ......................... 382/229 |
| 2007/0213983 | A1 | 9/2007 | Ramsey |
| 2008/0155399 | A1* | 6/2008 | Kock ............................. 715/259 |
| 2009/0083028 | A1 | 3/2009 | Davtchev et al. |
| 2012/0290286 | A1 | 11/2012 | Davtchev et al. |

FOREIGN PATENT DOCUMENTS

| | | | | |
|---|---|---|---|---|
| KR | 10-1997-0007686 | A | 2/1997 | |
| KR | 2001-0064751 | * | 12/1999 | ............. G06F 17/30 |
| KR | 10-2001-0064751 | A | 7/2001 | |
| KR | 2001-0064751 | | 7/2001 | |
| KR | 10-2006-0118253 | A | 11/2006 | |

OTHER PUBLICATIONS

International Preliminary Report on Patentability from International Application No. PCT/US2007/087582 mailed Jun. 25, 2009, 17 pages.

International Preliminary Report on Patentability from International Application No. PCT/US2008/074889 mailed Mar. 11, 2010, 9 pages.

International Search Report and Written Opinion from International Application No. PCT/US2008/074889 mailed Jan. 19, 2009, 18 pages.

Bilac et al, "Extracting transliteration pairs from comparable corpora," 2005, In Proceedings of the Annual Meeting of the Natural Language Processing Society, Japan, 4 pages.

Brill et al, "Automatically Harvesting Katakana-English Term Pairs from Search Engine Query Logs," 2001, in Proc. of NLPPRS, 7 pages.

Office Action dated Apr. 19, 2011 from Chinese Application No. 200710101817.8, 15 pages, (with English translation).

Examiner Olujimi A. Adesanya, Non-final Office Action in U.S. Appl. No. 12/201,788 dated Dec. 9, 2011, 34 pages.

Examiner Olujimi A. Adesanya, Final Office Action in U.S. Appl. No. 12/201,788 dated Aug. 16, 2012, 42 pages.

IL Office Action dated Jul. 15, 2013 (with English translation) from Israel Patent Office for Application No. 199327, 6 pages.

* cited by examiner

AUTOMATIC SEARCH QUERY CORRECTION

RELATED APPLICATIONS

This application claims priority to Chinese Patent Application No. 200710101817.8, filed on Apr. 16, 2007, U.S. Provisional Patent Application Ser. No. 60/875,425, filed on Dec. 15, 2006, and U.S. Provisional Patent Application Ser. No. 60/884,839, filed on Jan. 12, 2007. The contents of the above applications are incorporated by reference.

BACKGROUND

This specification relates to automatically changing a search query in a given script to a search query in another script.

A search engine enables a user to provide a search query for which search results are returned in response. In general, the query can include any character that the user is capable of generating with his or her input device. Input devices can have keys or buttons that are each capable of producing one of many characters. A keyboard, for example, can have multiple keyboard layouts. Each keyboard layout typically corresponds to the characters most frequently used within a particular writing system (i.e., a script). In countries whose writing systems are not based on the Latin alphabet, keyboards usually have at least two keyboard layouts, one for producing Latin characters (e.g., a U.S. English keyboard layout), the other for producing the characters of the user's native writing system (e.g., Cyrillic, Devanāgarī, or Arabic).

Generally, users are able to switch between two or more keyboard layouts very easily (e.g., typically with a single keystroke). The currently selected keyboard layout normally determines the characters produced by each key of the keyboard. A user may inadvertently use their input device to submit a query in one script when they really intended to provide the same query in another script. For example, a user searching for 'news' may inadvertently submit 'ד'קמ' on a Hebrew keyboard layout because the keystrokes that produce the characters 'ד'קמ' produce the characters 'news' on the corresponding Latin keyboard layout.

SUMMARY

This specification discloses various embodiments of technologies for automatically changing a search query in a given script to a search query in another script. Embodiments feature methods, systems, apparatus, including computer program product apparatus. Each of these will be described in this summary by reference to the methods, for which there are corresponding systems and apparatus.

In general, in one aspect, a first search query is received from a user, the first search query having one or more characters, and a search result is determined based on the first search query. Based on the search result, the first search query is determined to have an incorrect input mapping. A first keyboard layout is identified for the first search query, and a second keyboard layout is identified. A corrected search query is generated from the first search query by mapping characters from the first keyboard layout to characters in the second keyboard layout. A corrected search result is determined based on the corrected search query, and the corrected search result is presented to the user.

Implementations may include one or more of the following features. Multiple corrected search queries can be generated; one of the multiple corrected search queries can be selected; and the corrected search result can be presented to the user based on the selected one of the multiple corrected search queries.

In general, in another aspect, a first search query is received from a user, the first search query having one or more characters, and a search result is determined based on the first search query. The first search query is determined to have an incorrect input mapping based on the search result, and a corrected search query is generated from the first search query from a dictionary of input mapping corrections. A corrected search result is determined based on the corrected search query, and the corrected search result is presented to the user.

In general, in another aspect, a first search query is received from a user, the first search query including at least one or a combination of two or more of (1) one or more characters, (2) user languages settings, (3) a user language preference, (4) a user interface language, (5) a geographic location, and (6) user search history. A search result is determined based on the first search query. The first search query is determined to have an incorrect input mapping based on the search result. A first keyboard layout is identified for the first search query. A second keyboard layout is identified. A corrected search query is generated from the first search query by mapping characters from the first keyboard layout to characters in the second keyboard layout. A corrected search result is determined based on the corrected search query. The corrected search result is presented to the user.

Implementations may include one or more of the following features. The user language preference can be associated with a part of an operating system's language settings. The user language preference can be associated with information about a supplemental language support provided by an operating system. The user language preference can be associated with information of a web browser. The information of the web browser can be related to a language associated with the web browser. A page request of a web browser can be used to provide the user language preference.

The identifying of the first keyboard layout can be based on a language setting or language information of a system used by the user. The identifying of the first keyboard layout can be based on primary and secondary languages identified by the user. The identifying of the first keyboard layout can be based on a user preferred keyboard layout. The identifying of the first keyboard layout can be based on an inference from a language of the user interface. The identifying of the first keyboard layout can be based on information about a device connection of the user from which the user's geographic location and thus the user's most likely language are inferred. The identifying of the first keyboard layout can be based on search query history of the user. A portion of search results in the search query history, being less than an entire collection of search results in the search query history, can be used to identify the first keyboard layout. The portion of search results in the search query history can include search results that have been accessed by the user.

In general, in another aspect, a search query is received from a user, the search query including at least one or a combination of two or more of (1) one or more characters, (2) user languages settings, (3) a user language preference, (4) a user interface language, (5) a geographic location, and (6) user search history. A search result is determined based on the search query, and a keyboard layout associated with the search query is identified.

Implementations may include one or more of the following features. The identifying of the keyboard layout can be based on a language setting or language information of a system used by the user. The identifying of the keyboard layout can be based on primary and secondary languages identified by the user. The identifying of the keyboard layout can be based on a user preferred keyboard layout. The identifying of the keyboard layout can be based on an inference from a language of the user interface. The identifying of the keyboard layout can be based on information about a device connection of the user from which the user's geographic location and thus the user's most likely language are inferred. The identifying of the keyboard layout can be based on search query history of the user. A portion of search results in the search query history, being less than an entire collection of search results in the search query history, can be used to identify the first keyboard layout. The portion of search results in the search query history can include search results that have been accessed by the user.

In general, in another aspect, a search query is received from a user, the search query including user search history; a search result is determined based on the search query; and a keyboard layout associated with the search query is identified.

Implementations may include one or more of the following features. The search query can include at least one of (1) one or more characters, (2) user languages settings, (3) a user language preference, (4) a user interface language, and (5) a geographic location. A portion of search results in the search query history, being less than an entire collection of search results in the search query history, can be used to identify the first keyboard layout. The portion of search results in the search query history can include search results that have been accessed by the user.

In general, in another aspect, a keyboard layout used by a user is determined to be incorrect based on first search results responsive to an initial search query submitted by the user.

Implementations may include one or more of the following features. Second search results can be provided to the user using a corrected search query. The corrected search query can be generated from a dictionary of input mapping corrections. A corrected search query can be generated from the initial search query by mapping characters from the keyboard layout used by the user to characters in a corrected keyboard layout. The corrected keyboard layout can be determined based on a search query history associated with the user. The corrected keyboard layout can be determined based on a language setting associated with the user. The corrected keyboard layout can be determined based on a geographic location associated with the user. Multiple corrected search queries can be provided to the user. Corrected search results can be provided to the user responsive to a selection of one of the multiple corrected search queries by the user.

These and other aspects and features, and combinations of them, may be expressed as methods, apparatus, systems, means for performing functions, program products, and in other ways.

Advantages of the aspects and features can include one or more of the following. Queries can be corrected automatically without the user having to correct the query manually. Users can provide queries using an unfamiliar keyboard layout and still receive results as though the query had been generated by the user's preferred keyboard layout.

The details of one or more embodiments are set forth in the accompanying drawings and the description below. Other features, aspects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
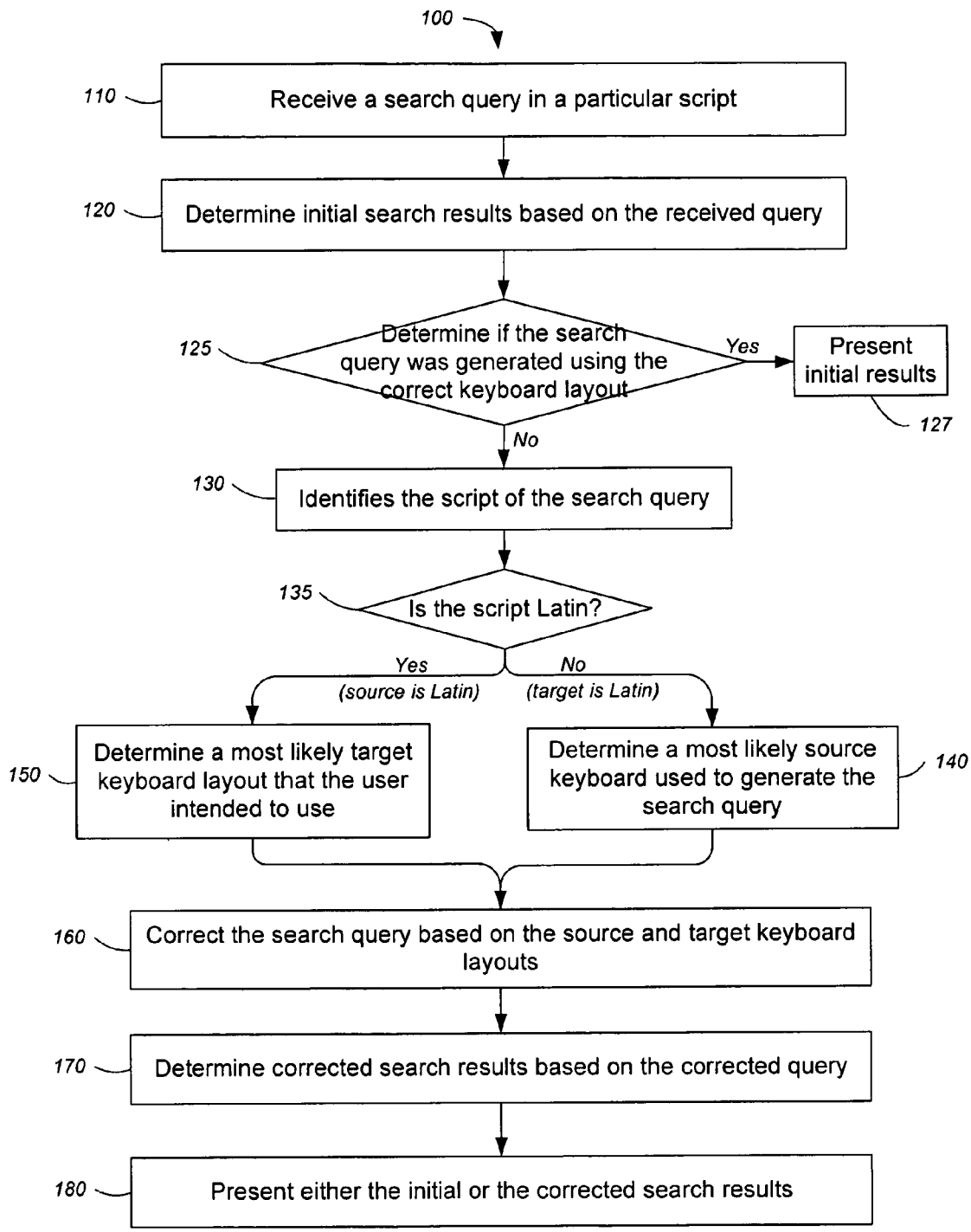
FIG. 1 is a flow diagram of a process for detecting and correcting an incorrect query.

As shown in FIG. 1, a process 100 determines whether a search query has been mistakenly entered using an incorrect keyboard layout and, if so, corrects the search query. The search query is received from a user (step 110). The search query is a string of one or more characters. The characters of the search query correspond to the characters used in a particular script (e.g., Latin, Cyrillic, Hebrew or Arabic). Sometimes characters received from the user are not the characters the user intended to provide.

The process 100 includes receiving a search query in a particular script (step 110). Initial search results are determined based on the received query (step 120). Search results are determined based on any convenient mechanism for determining search results. Typically, a corpus of items will be searched to identify particular items that are relevant to the search query. In general, a search result identifies many items. However, the initial search result may include no search result items.

The process 100 determines whether the initial search query was likely generated using the correct keyboard layout (step 125). The items in the initial search result can be counted to determine whether the initial search result identified a sufficient number of items. In some implementations, a threshold can be used to determine whether the number of items is sufficient (e.g., greater than zero or greater than ten). In other implementations, the threshold is proportional to the total number of items in the corpus of items. For example, the threshold may be 25, if the corpus contains 10,000 items; however, the threshold may only be 2, if the corpus contains 1000 items.

If the initial search query was likely generated by the correct keyboard layout, then process 100 is complete when the initial search results are presented to the user (step 127). Alternatively, if the search query was likely generated by the incorrect keyboard layout, then the search query is automatically corrected as though it had been generated by a user using a target keyboard layout.

A target keyboard layout corresponds to the keyboard layout that the user most likely intended to use to provide the search query. A source keyboard layout corresponds to the keyboard layout that the user most likely inadvertently used to provide the search query. The source and the target keyboard can be determined based on the characters used in the initial search query. Alternatively, the target keyboard can be determined based on a user's languages settings, language preferences, user interface language, geographic location, search history, or a combination of them.

The process 100 identifies the particular character set in which the search query is specified (step 130). In general, a character set refers to a group of characters within a family of characters. The family of characters is typically specified by a single consistent encoding (e.g., Unicode). The character set can be identified based on which group of characters are specified in the search query.

If the search query is specified in non-Latin characters (step 135), then the non-Latin search query can be corrected as though the user intended to generate the query on a Latin keyboard layout. In other words, the target keyboard layout is a Latin keyboard layout. The process 100 determines the source keyboard layout used to produce the non-Latin search query (step 140).

Many non-Latin character sets are produced by a single, predictable, keyboard layout. For example, Hebrew characters are generally produced using a standard Hebrew keyboard layout while Arabic characters are generally produced using a standard Arabic keyboard layout.

Not all non-Latin character sets, however, have a single corresponding keyboard layout. For example, Cyrillic script is used in both Russian and Bulgarian languages, and likewise, Cyrillic characters can be generated by both Russian and Bulgarian keyboard layouts. However, the Russian and Bulgarian keyboard layouts differ. The same keystroke on a Russian or Bulgarian keyboard layout will produce respectively different Cyrillic characters.

In general, a user provides a search query to a user interface typically associated with a particular language. When the user's source keyboard layout is ambiguous, the language of the search interface can be used to resolve the ambiguity. If, for example, the user has provided the search query to a Bulgarian user interface, the search query is likely to have been generated using a Bulgarian keyboard layout.

Alternatively, instead of resolving the ambiguity, query corrections can be generated for each applicable keyboard layout (e.g., for all applicable keyboard layouts or for a preferred subset). In some implementations, each corrected query is used to determine respective corrected search results. The numbers of items in the corrected search result are compared with one another to determine the source keyboard layout. Since a search query is unlikely to map to a meaningful term using an incorrect source keyboard layout, the corrected search result with the most items is taken as corresponding with the correct source keyboard layout.

If the search query is specified using Latin characters (step 135), then the Latin search query can be corrected as though the user intended to generate the query on a non-Latin keyboard layout. In other words, the source keyboard layout is a Latin keyboard layout. Although there are multiple Latin keyboard layouts that vary somewhat, the most commonly used keys on any Latin keyboard generate largely the same characters (e.g., the character A-Z and a-z). The process 100 determines the most likely target keyboard layout (step 150).

In some implementations, all potential corrections can be generated for every possible target keyboard layout. The large number of potential keyboard layouts, however, means that such an approach is inefficient. Instead, the process 100 can determine the user's most likely target keyboard layout using one or a combination of five alternative approaches.

The first approach is to identify further language settings or information from the user's system. For example, the user's system can automatically provide (or be specifically queried to provide) information about the user's language preferences (e.g., operating system language settings). A user's language preference can be specified as (or derived from) a part of an operating system's language settings or information about supplemental language support provided by the operating system or web browser (e.g., installed languages or language packs). For example, a web browser can automatically provide a user's language preferences with a page request.

Using the second approach, the user can explicitly identify primary and secondary languages, or alternatively, user preferred keyboard layouts. For example, the user providing the search query is associated with a predetermined profile in which the user sets language preferences.

In the third approach, the language of the user interface is used to infer the user's language preferences. If the user provides the search query to a Russian user interface, then the target keyboard layout can be assumed to be a Russian keyboard layout.

Using the fourth approach, when the user provides a search request through a network connected device, information about the device connection is used to infer the user's geographic location and thus the user's most likely language. For example, the user's Internet protocol (IP) address can be used to identify the approximate geographic location (e.g., typically a particular country) of the user's network device. A particular country can be associated with one or more languages that a given user would likely be using.

The fifth approach considers a user's search query history. A user's search query history includes search queries provided previously by the user. Each search query in the search query history corresponds to one or more search results, some of which may have been accessed by the user (e.g., the user clicked on a search result). Each search result is associated with a language that ideally identifies the language of the search result. The languages of the search results of all the user's search queries can be used to determine the most likely intended target language, from which the target keyboard layout is derived. For example, if, among all of a user's previous search results, 75% of search results are English and 20% are Hebrew, then the target keyboard layout is assumed to be English when the source keyboard layout is Latin. In some implementations, rather than consider all of the search results associated with the user's search query history, only the search results that have been accessed by the user are considered.

Each of the five approaches described above generally identifies a user's language preference. In general, a language that uses a non-Latin script has only one commonly-used keyboard layout. The particular keyboard layout that corresponds to the user's language preference is assumed to be the target keyboard layout.

The process 100 corrects the search query based on the identified source and target keyboard layouts (step 160). Keyboard layouts are well known and predefined. Therefore, a character mapping between keyboard layouts can be predefined. For example, a predefined mapping identifies that the Hebrew character 'מ' is produced on a Hebrew keyboard layout using the same keystroke that produces the Latin character 'n' on a Latin keyboard layout. A corrected search query can be generated by mapping each character in the received search query to a corresponding character in a corrected search query. A character in the received search query, generated by the source keyboard layout, is mapped to the corresponding character that would have been generated with the same keystroke using the target keyboard layout.

Figure 2:
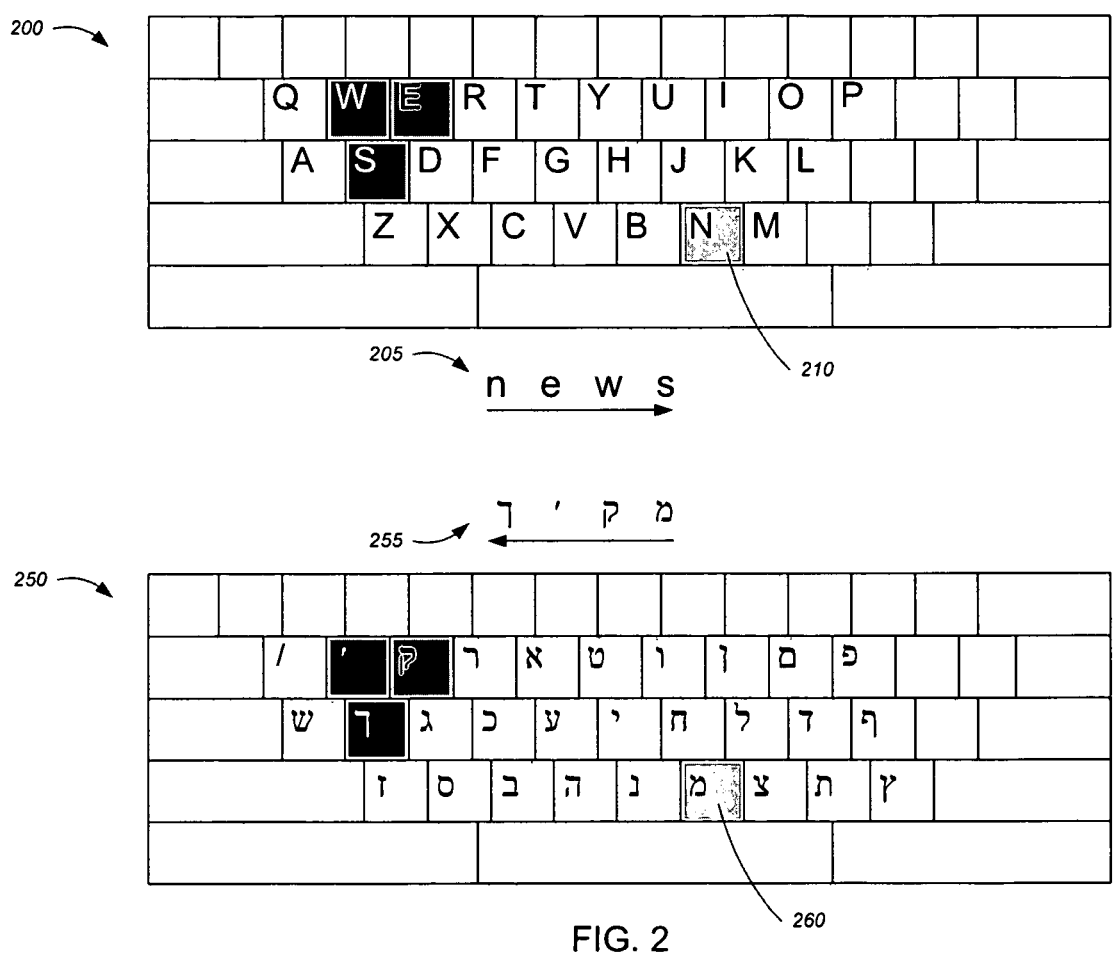
FIG. 2 illustrates two keyboard layouts used to produce two queries from the same keystrokes.

FIG. 2 illustrates two keyboard layouts, a US-English keyboard layout 200 and a Hebrew keyboard layout 250, used to produce two different queries based on the same keystrokes. The keyboard with the Latin keyboard layout 200 is used to produce a string 'news' 205. The sequence of characters 'n', 'e', 'w', and 's' are generated with the keystrokes shown in grey. For example, 'n' is generated from the keystroke 210.

The same keystrokes of the same keyboard with the Hebrew keyboard layout 250 generates the string 'ד'קמ' 255. Note that although the string 255 appears to be reversed compared to the characters produced from the same sequence of keystrokes, Hebrew text is written right-to-left. Therefore, 'מ' is the first character generated by the keystroke 260, which is the same as keystroke 210 that generated 'n' using the Latin keyboard layout 200.

Returning to FIG. 1, the process 100 determines corrected search results based on the corrected search query (step 170).

In some implementations, if more than one corrected search query is generated, then corrected search results are determined for each corrected search query.

The process 100 determines which of either the initial search results or the corrected search results are presented to the user (step 180). In some implementations, the number of items in the initial search result is compared to the number of items in the corrected search result. The search result with the greatest number of items is presented to the user.

In some implementations, the initial and corrected search result are each a suggestion-set. The items of a suggestion-set identify query suggestions that a user can select as a new search query from which new search results may be generated. Typically, the suggestion-set is identified from a first corpus (e.g., a corpus of search query suggestions), while the new search results are identified from a second corpus (e.g., a corpus of web pages).

Figure 3:
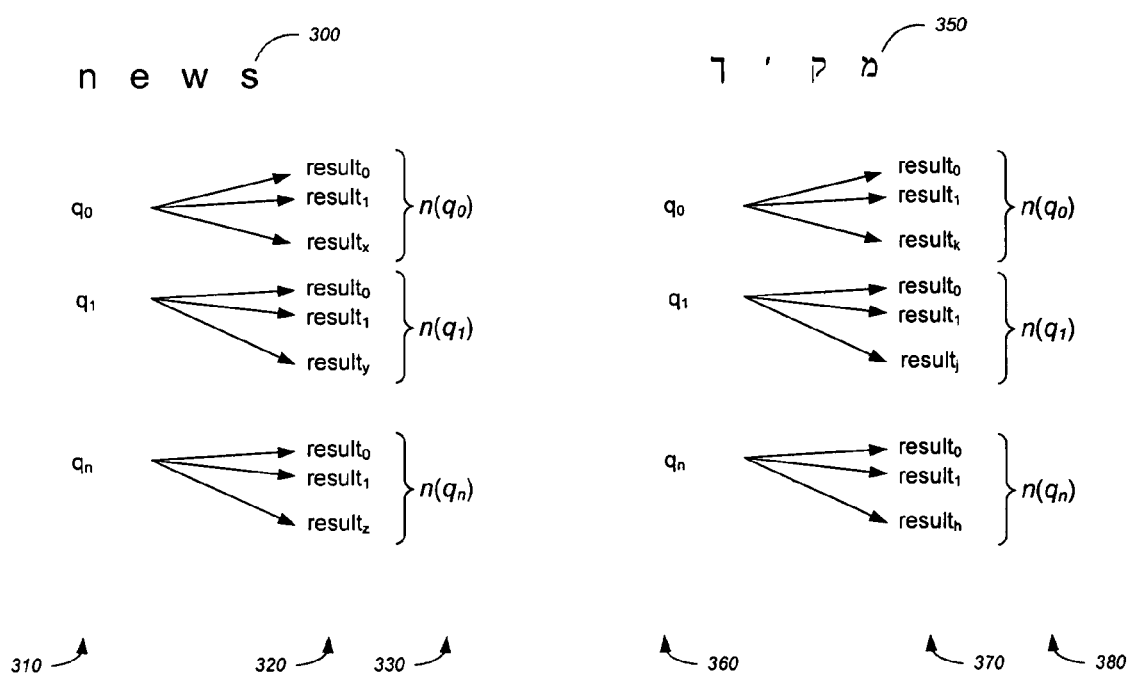
FIG. 3 illustrates query suggestions and each suggestion's associated query results.

FIG. 3 illustrates two suggestion-sets that correspond to the two search queries, 'news' 300 and 'דימק' 350 respectively. Each suggestion-set includes i suggestions (qi) 310, wherein i may be any integer from 0 to n. Each suggestion is in itself a query that when submitted as a new search query to the second corpus, yields (or would be expected to yield) some number of results 320. For example, the first suggestion, q0 is expected to generate x results. The value n(qi) 330 represents the expected number of results that the suggested query qi would yield.

The information associated with each query suggestion can be used to determine which of the suggestion-sets (initial or corrected) is presented to the user. For example, the expected results of each query suggestion in a suggestion-set are used to score the suggestion-set. In some implementations, the suggestion-set is scored based on an average (or a maximum or standard deviation) of the expected results of each query suggestion. In other implementations, the suggestion-set is scored based on the median of the expected results of each query suggestion.

Alternatively, the score of a suggestion-set (qsj) can be based on the following formula:

$$score_j = \left[\frac{n(qs_j)}{S}\right]$$

Where n(qsj) is the sum of n(q1), n(q2) ... n(qn) where n(qi) is the number of expected results for each potential search query qi in the suggestion-set qsj. The value of S can be the number of suggestions that is normally expected. In some implementations, the value of S is predefined (e.g., corresponding to a fixed limit for all suggestion sets). In other implementations, the value S can be periodically determined based on the average number of items in all suggestion-sets. The above formula demotes the scores of suggestion-sets that have fewer than the expected number of suggestions (S). In some cases, the first corpus of query suggestions can include suggestions based on erroneous strings that have been entered using the wrong keyboard layout (e.g., a string that makes no sense except if mapped using another keyboard layout). The demotion of suggestion-set scores based on S prevents presenting a suggestion-set that refers only to the erroneous strings in the first corpus.

In general, the suggestion-set with the greatest score is presented to the user. In some implementations, the initial suggestion-set can be scored before correcting the initial search query. The score of the initial suggestion-set is used to determine whether the initial search results were likely generated using an incorrect keyboard layout. In other words, this scoring technique can be used rather than counting the items in the initial search results, which was described in reference to FIG. 1 and step 125).

In some implementations, when a search query is automatically corrected, information is presented to the user indicating the automatic correction. In some implementations, multiple potential search queries (e.g., when target or source keyboard layout is ambiguous) can be presented. One of these presented corrected search queries can be explicitly selected by a user.

In some implementations, a dictionary of common search query corrections can be maintained. The dictionary contains search query entries and corresponding corrections. The dictionary can be generated by analyzing the logs of search queries that have been received from users (e.g., off-line, rather than in immediate response to a user's search query). Each logged search query can be considered in the same manner as described in reference to FIG. 1. The dictionary of common search queries can be used as a cache. When a search query is received from a user, the search query can be used to lookup corrections in the dictionary. If corrections exist in the dictionary, the search query can be corrected based on the dictionary entry. When a dictionary entry contains more than one potential correction (e.g., because the same search query could have been entered by more than one source keyboard layout), the source or target keyboard layout can be determined to resolve which dictionary correction to apply. If no corrections exist, the search query can be subject to the process 100 described in reference to FIG. 1.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Although the foregoing specification refers to input devices such as a keyboard which can have one of several keyboard layouts, the foregoing specification can equally apply to any device that can generate one of several sets of characters. Moreover, the Latin and Hebrew scripts used throughout the above specification are used only as examples; any other combination of keyboard layouts can be similarly used.

What is claimed is:

1. A computer-implemented method comprising:
    receiving, at a search engine, a first search query entered into a search engine user interface as a sequence of characters in a first language script by a user of a user device using a user device keyboard, the user device keyboard comprising a plurality of keys, the user device mapping keystrokes on the plurality of keys into characters in the first language script using a currently selected keyboard layout that defines a mapping from keys in the plurality of keys to characters in the first language script;
    obtaining a first search result responsive to the first search query;
    determining, by the search engine that the first search result has a number of items that is less than a threshold number, and, as a consequence:
        identifying a first keyboard layout corresponding to the characters in the first search query, wherein the first keyboard layout defines a first mapping from keyboard keys to characters in the first language script;

determining a second keyboard layout from a plurality of possible keyboard layouts, each of which are different from the first keyboard layout, wherein the second keyboard layout defines a second mapping from keyboard keys to characters in a different, second language script;

generating a second search query from the first search query by mapping the characters in the first search query to characters in the second language script by napping from characters in the first keyboard layout to characters in the second keyboard layout;

obtaining a second search result responsive to the second search query; and transmitting the second search result to the user device in a response to the first search query.

2. The method of claim 1, further comprising:

generating multiple second search queries, wherein each second search query is generated by mapping the characters in the first search to characters in a respective language script by mapping from characters in the first keyboard layout to characters in a respective keyboard layout; and selecting one of the multiple second search queries;

wherein obtaining the second search result includes obtaining the second search result responsive to the selected one of the multiple second search queries.

3. A system, comprising:

one or more processors; and a machine readable storage device including a program product that when executed by the one or more processors causes the one or more processors to perform operations comprising:

receiving, at a search engine, a first search query entered into a search engine user interface as a sequence of characters in a first language script by a user of a user device using a user device keyboard, the user device keyboard comprising a plurality of keys, the user device mapping keystrokes on the plurality of keys into characters in the first language script using a currently selected keyboard layout that defines a mapping from keys in the plurality of keys to characters in the first language script;

obtaining a first search result responsive to the first search query;

determining, by the search engine, that the first search result has a number of items that is less than a threshold number, and, as a consequence:

identifying a first keyboard layout corresponding to the characters in the first search query, wherein the first keyboard layout defines a first mapping from keyboard keys to characters in the first language script;

determining a second keyboard layout from a plurality of possible keyboard layouts, each of which are different from the first keyboard layout, wherein the second keyboard layout defines a second mapping from keyboard keys to characters in a different, second language script;

generating a second search query from the first search query by mapping the characters in the first search query to characters in the second language script by mapping from characters in the first keyboard layout to characters in the second keyboard layout;

obtaining a second search result responsive to the second search query; and transmitting the second search result to the user device in a response to the first search query.

4. The system of claim 3, wherein the operations further comprise:

generating multiple second search queries, wherein each second search query is generated by mapping the characters in the first search to characters in a respective language script by mapping from characters in the first keyboard layout to characters in a respective keyboard layout; and selecting one of the multiple second search queries;

wherein obtaining the second search result includes obtaining the second search result responsive to the selected one of the multiple second search queries.

5. The method of claim 1, comprising:

identifying a user language preference of the user device using one or more of user languages settings, a user identified language, a user interface language, a geographic location, or a user search history;

wherein determining the second keyboard layout comprises identifying the second keyboard layout based on the user language preference of the user device.

6. The method of claim 5, wherein the user language setting is associated with at least one of: language settings of an operating system, information about a supplemental language support provided by the operating system, or information of a web browser.

7. The method of claim 6, wherein the information of the web browser is related to a language associated with the web browser.

8. The method of claim 5, wherein the user language preference is identified using the user language setting, and the method further comprises:

using a page request of a web browser to provide the user language setting.

9. The method of claim 5, wherein the identifying of the first keyboard layout is based on a language setting or language information of an operating system executed by the user device.

10. The method of claim 5, wherein the identifying of the first keyboard layout is based on primary and secondary languages identified on the user device.

11. The method of claim 5, wherein the identifying of the first keyboard layout is based on a user preferred keyboard layout.

12. The method of claim 5, wherein the user language preference is identified using the user interface language, and the identifying of the first keyboard layout is based on an inference from the user interface language.

13. The method of claim 5, wherein the identifying of the first keyboard layout comprises inferring a most likely language for the user device from information about a device connection of the user device.

14. The method of claim 5, wherein the identifying of the first keyboard layout is based on search query history.

15. The method of claim 14, wherein a portion of search results in the search query history, being less than an entire collection of search results in the search query history, is used to identify the first keyboard layout.

16. The method of claim 15, wherein the portion of search results in the search query history includes search results that have been accessed by the user device.

17. A computer-implemented method, comprising:

receiving, at a search engine, a search query entered into a search engine user interface as a sequence of characters in a first language script by a user of a user device using a user device keyboard, the user device keyboard comprising a plurality of keys, the user device configured to map keystrokes on the plurality of keys into characters in the first language script using a currently selected keyboard layout that defines a mapping from keys in the plurality of keys to characters in the first language script;

receiving a search query history for the user device;

obtaining a search result responsive to the search query; and determining, by the search engine, that the search result has a number of items that is less than a threshold number, and, as a consequence:

identifying a second keyboard layout for the search query based on a portion of search results in the search query history, the portion being less than an entire collection of search results in the search query history, wherein the second keyboard layout defines a mapping from keyboard keys to characters in a different, second language script.

18. The method of claim 1, further comprising:

providing the second search result to the user device in place of the first search result.

19. The method of claim 1, wherein an item in the first search result is an item from a corpus of items identified as being relevant to the first search query.

\* \* \* \* \*

UNITED STATES PATENT AND TRADEMARK OFFICE
CERTIFICATE OF CORRECTION

| | |
|---|---|
| PATENT NO. | : 8,676,824 B2 |
| APPLICATION NO. | : 11/956692 |
| DATED | : March 18, 2014 |
| INVENTOR(S) | : Guy Tavor |

It is certified that error appears in the above-identified patent and that said Letters Patent is hereby corrected as shown below:

In the Claims:

Column 11, in claim 1, at line 10, delete "napping" and insert --mapping--.

Signed and Sealed this
First Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,676,824 B2 | Page 1 of 1 |
| APPLICATION NO. | : 11/956692 | |
| DATED | : March 18, 2014 | |
| INVENTOR(S) | : Guy Tavor | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this
Sixteenth Day of June, 2015

Michelle K. Lee
*Director of the United States Patent and Trademark Office*